Figure 2:
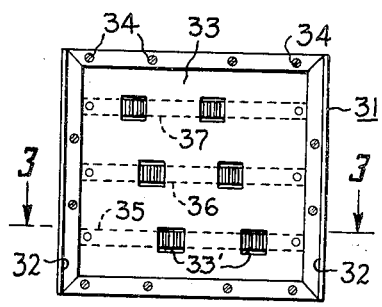

Nov. 14, 1961 L. E. FISHER 3,009,011
DISTRIBUTION SYSTEM

Original Filed March 2, 1956 2 Sheets-Sheet 1

INVENTOR.
LAWRENCE E. FISHER
BY Robert T. Casey
ATTORNEY

Nov. 14, 1961 L. E. FISHER 3,009,011
DISTRIBUTION SYSTEM
Original Filed March 2, 1956 2 Sheets-Sheet 2

INVENTOR.
LAWRENCE E. FISHER
BY Robert H. Casey
ATTORNEY

United States Patent Office 3,009,011
Patented Nov. 14, 1961

3,009,011
DISTRIBUTION SYSTEM
Lawrence E. Fisher, Southington, Conn., assignor to General Electric Company, a corporation of New York
Original application Mar. 2, 1956, Ser. No. 569,182, now Patent No. 2,906,811, dated Sept. 29, 1959. Divided and this application July 27, 1959, Ser. No. 829,902
5 Claims. (Cl. 174—88)

My invention relates to electric power distribution systems of the bus bar type such as used in industrial and commercial buildings for delivering power from a substation or transformer bank to a power-consuming area, and generally referred to as "feeder" distribution systems or busways. This application is a division of my earlier filed application Serial No. 569,182, filed March 2, 1956, now Patent No. 2,906,811, and assigned to the same assignee as the present invention.

Feeder distribution systems of the type referred to are adapted to carry relatively large amounts of current, ranging from 600 to more than 4000 amperes and are made up of a number of prefabricated longitudinal sections, each containing a number of bus bars, such sections being adapted to be joined end-to-end and suspended from a wall or ceiling. The installation and interconnection of such sections of prior systems is often relatively cumbersome and tedious, requiring the bolting together of a large number of individual pairs of bus bars. In a typical design, for instance, having a rating of 2500 amperes, there are 20 bars in each section, each bar requiring two bolts to connect it to the corresponding bar of the next succeeding section, making a total of 40 bolts required to be tightened at every section joint. Each of such bolts must be tightened with a pressure of approximately 2000 pounds. The maintenance of such a system also requires individual checking of this same number of fastening elements periodically. The physical positioning of each section during installation, prior to bolting together of the bus bars, is likewise often relatively difficult with present systems. Thus, each section to be installed must be independently elevated and maneuvered into position with its bars overlapping and interleaved with the bars of the preceding section and carefully adjusted so that the holes of the overlapped bars are in alignment before bolting together can be accomplished.

While attempts have been made in the past to provide simpler connecting schemes, such proposed structures have not been sufficiently practicable to meet the requirements of commercial applications or to compete economically with the individually connected bus bar type.

It is an object of my invention to provide an electric power distribution system of the bus bar type in which succeeding sections may be effectively joined by a simple plug-in type of connection, supplemented by clamping bolts applying pressure to all bus bar connections simultaneously.

Another important object of my invention is to provide an electric power distribution system or busway including sections having interengaging portions adjacent their respective ends which may be used to support a portion of the weight of a section during its installation and also to guide the section into the proper installed position.

In carrying out my invention in one form, I provide an electric power distribution system comprising an assembly of elongated bus bars supported in generally parallel relation within a sheet metal housing to form a busway section, and insulating means surrounding the ends of the bus bars at one end of the section, the insulating means providing recesses each of which contains a bus bar end and is also adapted to receive a corresponding bus bar end of an adjacent similar section in overlapping relation to the first bus bar end within the recess and clamping means extending across all of the bus bar ends for clamping all of the overlapped bus bar ends together simultaneously.

According to another aspect of my invention, the section housing ends are provided with portions adapted to interengage with corresponding portions of adjacent sections to permit a guided sliding movement during the assembly of such sections as well as to support and connect the sections when completely installed.

My invention will be more fully understood from the following description taken in connection with the accompanying drawings and its scope will be pointed out in the appended claims.

Figure 3:
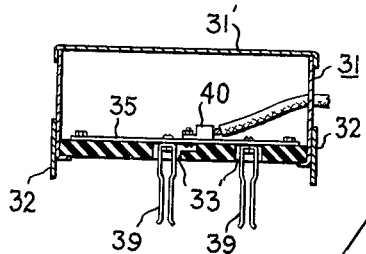
Figure 1:
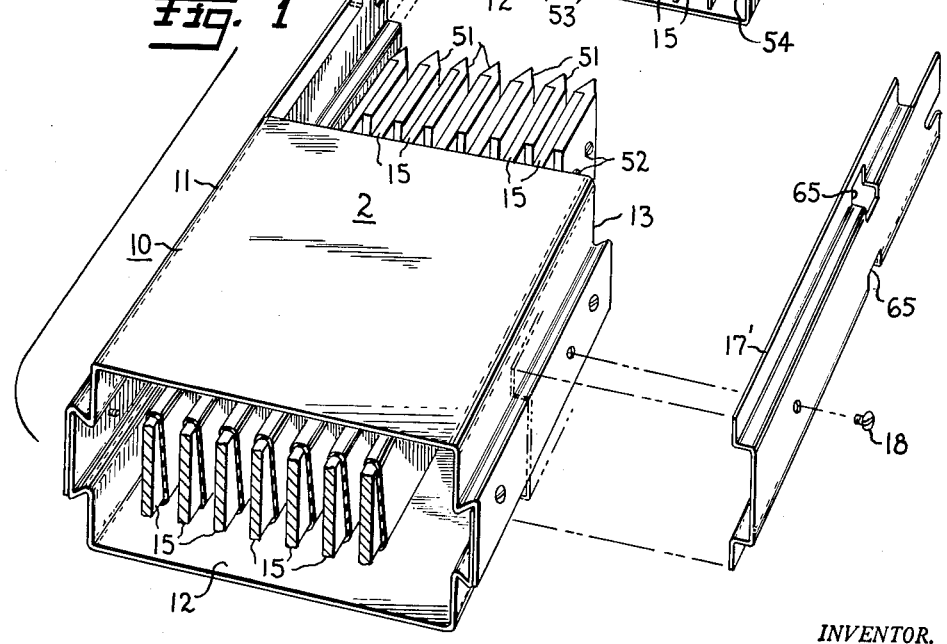
Figure 4:
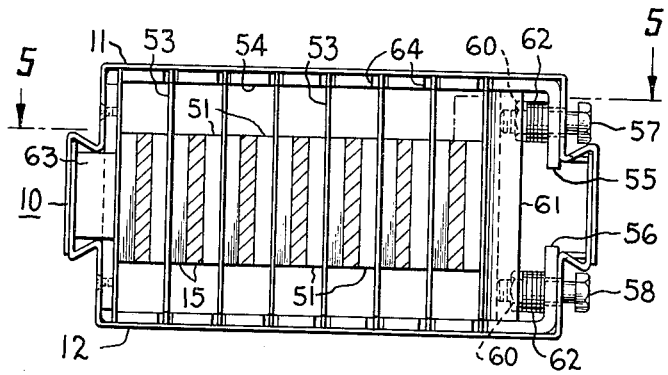
Figure 5:
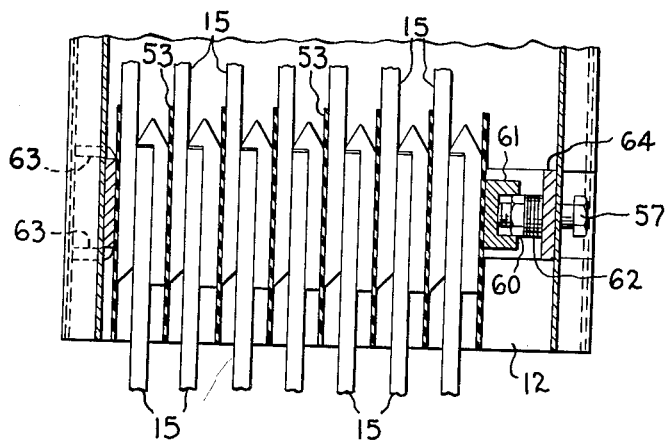
Figure 7:
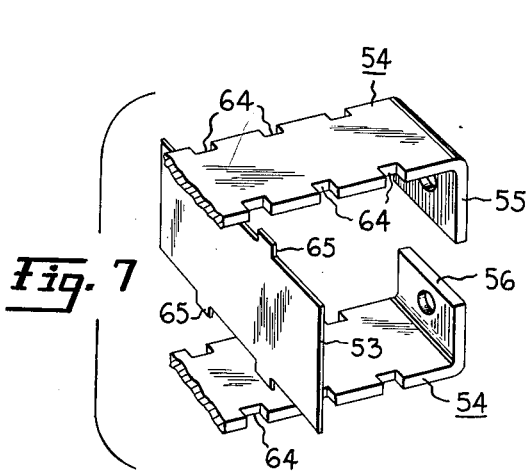
Figure 6:
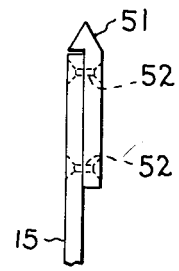

In the drawings, FIGURE 1 is a view in perspective of the adjacent end portions of two bus bar distribution system sections made in accordance with my invention and shown in longitudinally displaced relation;
FIGURE 2 is a bottom plan view of a cable tap-off device for use with the distribution system of FIGURE 1;
FIGURE 3 is a sectional view taken on the line 3—3 of FIGURE 2;
FIGURE 4 is a sectional view of the joint in assembled condition but with splice plates removed;
FIGURE 5 is a view taken on the line 5—5 of FIGURE 4;
FIGURE 6 is a detail view of a bus bar termination;
FIGURE 7 is a perspective view of a portion of the clamping and insulating means.

Referring to the drawings, I have shown my invention as embodied in an electric power distribution system including sections 1 and 2 of FIGURE 1. The sections are identical and each comprises an elongated generally rectangular duct or housing 10, both of which are made up of two interfitting, generally U-shaped portions 11 and 12. Supported within the housing in generally parallel closely spaced side-by-side arrangement by supporting and insulating means to be described, are a plurality of elongated bus bars 15.

The distribution system sections 1 and 2 are adapted to be connected together by a plug-in type of engagement, each being provided with a stab-type connecting termination at one end 13 thereof, and with a socket or stab-receiving termination at the other end 14 thereof.

It will be understood that the stab end 13 (not shown) of section 1 opposite from socket end 14 is identical to the stab end 13 of section 2, and that the socket end 14 (not shown) of section 2 opposite from stab end 13 is identical to the socket end 14 of section 1. At the socket end 14 of each section, the bus bars 15 terminate slightly short of the end of the housing. At the stab end 13 the bus bars 15 project a short distance beyond the end of the housing. A pair of bridging splice plates 17 and 17' are provided, which are adapted to overlap the abutting ends of the housings when the sections 1 and 2 are in connected relation. The plates 17 are attached to the housing sides by means of retaining screws 18. The splice plate 17' is provided with openings 65 to provide clearance for and afford access to the heads of bolts 57. The plate 17 may be, and preferably is, normally carried by the section 2 during interconnection of the sections, and serves as a guide to facilitate such interconnection. The plate 17', however, is assembled laterally, after the sections 1 and 2 are joined.

The bus bars 15 of each section are supported within the housing 10 at a number of longitudinally spaced points in insulated relation, in any suitable manner by supporting and insulating means such, for instance, as shown in Patent 2,576,774 issued to E. T. Carlson and assigned to the same assignee as the present invention.

At the stab end 13, the bus bars 15 are provided with tapered spacing blocks 51 mounted on the projecting ends thereof by suitable means such as by screws 52. While I have shown the spacer block 51 as comprising metallic material, it will be understood that the block 51 may, if desired, be made of suitable insulating material.

When the sections 1 and 2 are in connected relation, each pair of overlapped bus bars 15 is separated from the adjacent overlapped pair by a plate of insulating material 53 which is generally rectangular in outline. The assembly of overlapped bar ends is encircled by a heavy metallic generally C-shaped bracket 54 having its ends 55 and 56 bent inwardly and provided with holes through which pass pressure bolts 57 and 58 respectively. A number of dished-type spring washers 62 are carried by the bolts 57 and 58 between the nuts 60 and the inturned end of the bracket 54. As the bolts 57 and 58 are turned inwardly into the nuts 60, the ends of the bolts press against a pressure plate 61, pressing it against the assembly of overlapped bar ends toward the bight end of the bracket 54. The bracket 54 is also preferably provided with outwardly bent parallel projecting portions 63 carried by the bight thereof. The insulating plates 53 and the bracket 54 have interfitting portions comprising notches 64 in the bracket 54 and projecting lug portions 65 in the insulating plates 53 whereby the insulating plates 53 are loosely held in place upon separation of the two connected sections. The plate 61 comprises one portion, and the nuts 60 comprise another portion of a pressure applying device, and these two portions are relatively movable in opposite directions in response to turning of the bolts.

The busway system also includes features by which it is adapted to serve both as a low-reactance high-capacity "feeder" type of busway whose main function it to transmit power from one location to another, and also as a "plug-in" type of busway, intermediate portions of which are adapted to serve as sockets for the reception of plug-in type power take-off connections for energizing branch circuits or power consuming devices.

As shown in the drawings applicant's busway includes a number of closely spaced bus bars, being equal in number to a multiple of the number of phase-displaced power sources or "phases" of the electrical system with which it is to be used. The embodiment illustrated is designed for use with a three-phase power system and includes double this number of bars, plus a "neutral" bar. For the purpose of adapting at least one intermediate portion of such a system to serve as a socket for the reception of a power take-off plug, selected portions of the bus bars are left free of insulation to provide contact areas as at A—A, B—B, and C—C (FIGURE 1). The portions A, B, and C are staggered or spaced apart longitudinally of the bus bars, but similar phase bar contact areas are aligned transversely of the bars as shown. Thus there is provided a plurality of bus bar contact areas, but adjacent bus bars being insulated adjacent such contact areas. An opening 30 is provided in the housing portion 11 adjacent such bar contact areas and a cover 30' is provided to close the opening when not in use.

For the purpose of providing a power take-off device for use at such contact areas, I provide a plug-in connecting device as shown in FIGURES 2 and 3 and including a generally rectangular enclosure 31 having depending side flanges 32 along opposite sides thereof adapted to overlap a portion of the sides of the busway housing and to be attached thereto by suitable means such as by screws (not shown).

An insulating supporting plate 33 is mounted in the enclosure 31 by means of screws 34 through inturned flanges carried by the sides of the enclosure 31. The plate 33 thus forms the bottom wall for the enclosure 31 and is provided with a number of apertures 33', through which contact members 39 are adapted to project. The contact members 39 are arranged in pairs, each pair mounted on a common cross-connecting strap 35, 36, 37 and each pair adapted to make contact with a pair of bus bar contact areas A—A, B—B and C—C. Suitable conductor-connecting means are provided such as pressure-type connector 40 mounted on each of the straps 35, 36 and 37.

While I have shown and described only one specific embodiment of my invention, it will be apparent that many modifications thereof may be made, and I, therefore, intend, by the appended claims, to cover all such modifications as fall within the true spirit and scope of my invention.

What I claim as new and desire to secure by Letters Patent of the United States is:

1. A busway comprising a plurality of busway sections each including elongated relatively closely spaced bus bars having exposed connecting portions at the ends thereof, insulating spacer means, the connecting portions of one of said sections being interleaved with the connecting portions at the ends of corresponding bus bars of the adjacent section with said insulating spacer members between adjacent pairs of said interleaved connecting portions, means for applying clamping pressure to said interleaved connecting portions and said insulating spacer members simultaneously comprising a pressure applying device having two portions movable in relatively opposite directions, one of said relatively movable portions of said pressure device being positioned to bear against an outermost one of said insulating spacer members to force it toward said connecting portion assembly, a force transmitting frame substantially encircling said interleaved connecting portions and said insulating spacer members and including a portion positioned to bear against the opposite side of said assembly, the other of said relatively movable portions of said pressure applying device being mounted to exert a force on said force-transmitting frame in a direction away from said connecting portion assembly, and adjustable means cooperating with said relatively movable portions for effecting relative movement therebetween for exerting said forces.

2. Electric power distribution system apparatus comprising a first and second busway section, each of said busway sections including a plurality of elongated relatively closely spaced bus bars arranged in a row transversely of said sections and having exposed connecting portions at the ends thereof, the exposed connecting portions of said bus bars of said first busway section being interleaved with the exposed connecting portions of said bus bars of said second section; insulating spacer means between adjacent pairs of said interleaved bus bar connecting portions; and clamping means for applying clamping pressure to said interleaved bus bar connecting portions and insulating spacers simultaneously comprising a rigid structural member substantially encircling said assembly of bus bar ends and insulating spacers, and adjustable force applying means having a first portion positioned to bear against the outermost one of said insulating spacers at one side of said assembly, and having a second portion positioned to bear against a portion of said encircling structural member adjacent said one side of said assembly, said first and second portions of said force applying means being movable in relatively opposite directions away from each other to effect compression of said bus bar end assembly against the opposite portion of said encircling means, and adjustable means cooperating with said relatively movable portions to effect relative movement therebetween to cause said compression.

3. A busway comprising a pair of busway sections each including a plurality of elongated generally parallel bus bars supported in side-by-side insulated relation in a row, said bus bars being spaced apart a distance greater than the thickness of said bars and having end portions with the end portions of the bars of one section being interleaved with similar end portions of bus bars of the other busway section to provide a plurality of overlapped pairs of bus bar end portions, said bus bar end portions of said one section having one side thereof exposed for contacting said end portions of said bus bars of said other busway section, insulating spacer means between adjacent pairs of said overlapped pairs of bus bar end portions, clamping means including a force-transmitting member having a portion extending transversely beside said end portions of said bus bars and a first side portion extending generally at right angles to said transversely extending portion at one side of said end portions and a second side portion extending generally at right angles to said transversely extending portion at the other side of said end portions, a pressure plate extending generally parallel to said one side portion and spaced away therefrom, a nut member supported relatively stationary with reference to said one side and adapted to exert a pressure thereagainst, and a pressure-applying bolt threadedly engaged in said nut and having its end portion adapted to bear on said pressure plate, whereby tightening said bolt causes the inner end thereof to exert a compressive force against said pressure plate and forces said nut against said one side of said force transmitting member placing it in tension.

4. An elongated busway comprising: a pair of busway sections each including a plurality of elongated generally parallel bus conductors supported in side-by-side insulated relation in a row transversely of said sections, said bus conductors being spaced apart a distance greater than the thickness of said conductors and having end portions with the end portions of one section interleaved with similar end portions of bus conductors of said other section to provide a connection joint including a plurality of overlapped pairs of bus conductor end portions, said bus conductor end portions of said one section having one side thereof exposed for contacting the end portions of the bus conductors of said other section, insulating spacer means between adjacent pairs of said overlapped pairs of bus conductor end portions; and clamping means including a rigid structural member at least partially encircling the end portions of said bus conductors and having a first portion at one side of said joint and a second portion at the opposite side of said joint, said first portion of said structural member being positioned to bear against one side of said joint, a pressure plate movably supported by said structural member adjacent said second portion for bearing against the other side of said joint, a bolt passing through said structural member at said second portion without threadably engaging the same and bearing against the said other side of said joint, and a nut threadably carried by said bolt between said pressure plate and the second portion of said structural member, whereby tightening said bolt places said connection joint in compression and said structural member in tension.

5. An elongated busway comprising: a pair of busway sections each including a plurality of elongated generally parallel bus conductors supported in side-by-side insulated relation in a row in said sections, said bus conductors being spaced apart a distance greater than the thickness of said conductors and having end portions with the end portions of said one section interleaved with similar end portions of bus conductors of said other section to provide a connection joint including a plurality of overlapped pairs of bus conductor end portions, said bus conductor end portions of said one section having one side thereof exposed for contacting the end portions of the bus conductors of said other section; and joint forming means at said joint including a C-shaped rigid structural member having a bight portion adjacent an outermost one of said bus conductors and a pair of arms extending along opposite sides of said row of conductors and terminating beyond the opposite outermost bus conductor, said structural member having spaced slots along the arms thereof, a plurality of insulating spacers positioned in said slots and extending between arms of said structural member generally parallel to said bight portion between adjacent bus conductors, and adjustable force applying means including a pair of bolts loosely received in the ends of said arms of said structural member, and a pair of nuts each threadably carried on the inner end of a separate one of said bolts, said bolts being effective in response to rotation thereof to compress the assembled connection joint against the bight portion of said structural member and to cause said nuts to exert an outward force against said arms thereby placing said structural member in tension.

References Cited in the file of this patent

UNITED STATES PATENTS

| | | |
|---|---|---|
| 2,350,601 | Frank et al. | June 6, 1944 |
| 2,411,128 | Carlson | Nov. 12, 1946 |

FOREIGN PATENTS

| | | |
|---|---|---|
| 535,518 | Belgium | Feb. 28, 1955 |